No. 819,303. PATENTED MAY 1, 1906.
G. D. MUNSING.
WHEEL MOUNT FOR VEHICLES.
APPLICATION FILED SEPT. 26, 1905.
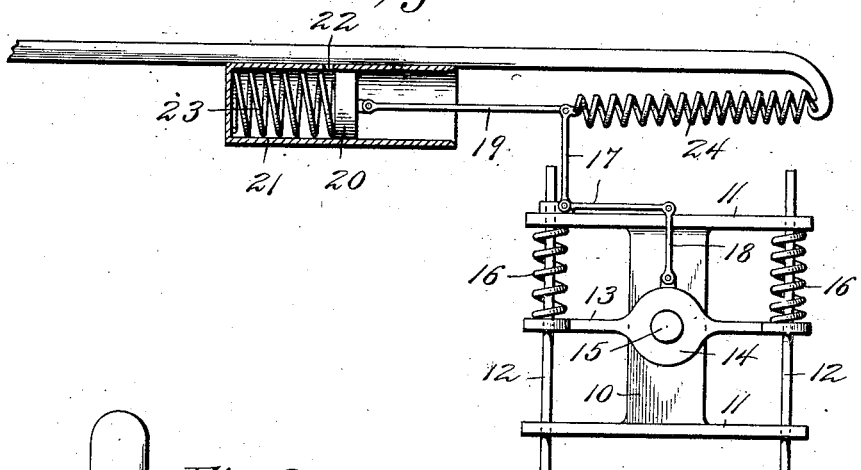
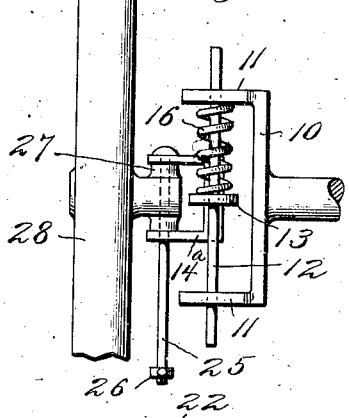
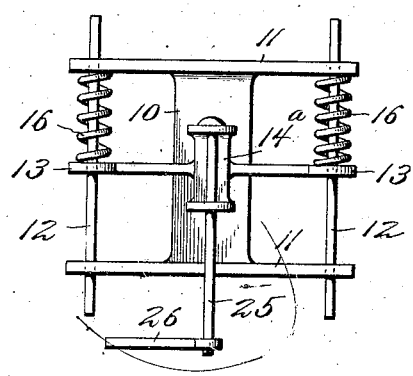
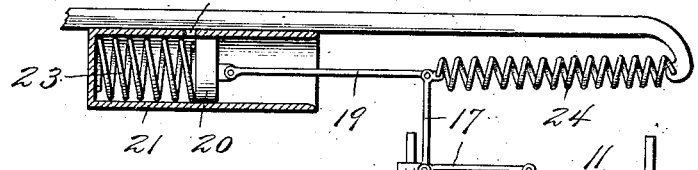
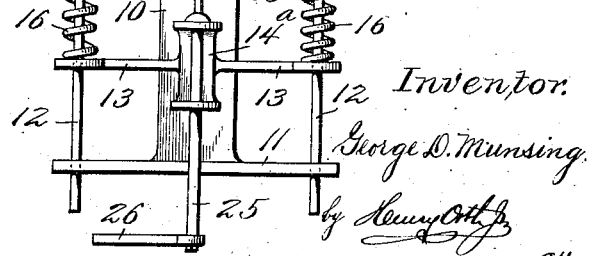
Witnesses.
Harry L. Amer.
R. M. Sommers
Inventor.
George D. Munsing.
by Henry Ott Jr.
atty.

UNITED STATES PATENT OFFICE.

GEORGE D. MUNSING, OF NEW YORK, N. Y.

WHEEL-MOUNT FOR VEHICLES.

No. 819,303.	Specification of Letters Patent.	Patented May 1, 1906.

Application filed September 26, 1905. Serial No. 280,201.

*To all whom it may concern:*

Be it known that I, GEORGE D. MUNSING, a citizen of the United States, residing at the city of New York, in the county and State of New York, have invented certain new and useful Improvements in Wheel-Mounts for Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to wheel-mounts, and has for its object to separately mount and cushion each wheel, so that when passing over an obstruction or unevenness in the road the jolt of one wheel will not be imparted to the others or to the vehicle-body. I also make the mounting such that the spring-supporting member for the wheel will not bind during the vertical movement of the wheel and provide auxiliary cushioning means with details of construction, to be hereinafter fully described, and pointed out in the claims.

Referring to the drawings, in which like parts are similarly designated, Figure 1 is an elevation, partly in section, of a mount for a rear wheel. Fig. 2 is a side view, and Fig. 3 an elevation, of a mount for a steering-wheel; and Fig. 4 is an elevation, partly in section, of a steering-wheel mount similar to Fig. 1.

Referring to Fig. 1, the wheel-axle is provided with a fork 10 at its ends, the tines 11 of which are enlarged or extended laterally and provided with perforations, the perforations in one tine being in vertical alinement with those in the other, in which perforations slide rods 12. The rods 12 are secured in the lateral projection 13 of a support 14, in which is mounted the wheel-spindle 15. Springs 16 surround the rods 12 and are held between the ends of projections 13 and the upper tine, the rods being free to slide through the perforations in the tines.

For light vehicles so much of the construction will give very good results, but for heavier vehicles I use in connection therewith a supplemental cushioning device consisting of a bell-crank lever 17, mounted on the upper tine of the fork 10 and connected at one end by a link 18 to the support 14 and at the other end by a rod or link 19 to a piston 20 of a dash-pot or cushioning-cylinder 21. This cylinder has a perforation or air-port 22, closed by the piston when the latter has been partially moved inward, and thereby confines a body of air acting as an air-cushion to retard the inward movement of the piston and cushion the upward movement of the wheel. A coil-spring 23 is placed in the cylinder 21, against which the piston 20 acts to assist or augment the action of the air-cushion. A second coil-spring 24 connects the end of the piston-rod and bell-crank lever to the frame of the vehicle and also augments the resistance to upward movement of the wheel.

Figs. 2 and 3 show a mount designed for the steering-wheel, 10 being the fork, 12 the vertically-movable rods, and 16 the springs located between the upper tine of the fork and the support extensions 13. The support in this case is forked, as shown at 14ª, and through the tines thereof loosely passes a bolt or rod 25, extended somewhat below the main fork 10 and having on its end a rod 26, to which is connected the steering-bar, as is customary. On rod 25 and within fork 14ª is mounted the vertical boss 27 of a steering-wheel 28, so that this wheel, whose boss is rigidly connected to rod 25, will be free to turn within the fork.

In Fig. 4 I have shown a structure identical with that shown in Figs. 2 and 3 and, cooperating therewith, the auxiliary cushioning device shown in Fig. 1 and consisting of link 18, connected to 14ª, and bell-crank 17, rod 19, cylinder 21, having air-port 22, piston 20, and springs 23 and 24, operating as described with relation to Fig. 1.

Having thus described my invention, what I claim as new therein, and desire to secure by Letters Patent, is—

1. In a wheel-mount, the combination with a fork, of a support, means at each side of the support in the fork to yieldingly and non-rotatably guide the same, and a wheel-spindle secured to said support between said means, substantially as described.

2. In a wheel-mount, the combination with a fork; of a support non-rotatable in the fork and vertically movable between the tines of the fork, a wheel-spindle secured to the support, and cushioning means at each side of the spindle to cushion the movement of the spindle and support, substantially as described.

3. In a wheel-mount, the combination with a fork; of a support having lateral extensions, coil-springs between the extensions and the fork to permit non-rotatable vertical movement of the support within the fork and a wheel-spindle secured to the support.

4. In a wheel-mount, the combination with a fork; of a support having lateral extensions, rods fixed to the extensions and passing through the tines of the fork, coil-springs surrounding the rods and between the extensions and upper tine of the fork and a wheel-spindle secured to the support.

5. In a wheel-mount, the combination with a fork; of a support, means to yieldingly and non-rotatably mount the support in the fork, a second fork on the support and a wheel-spindle mounted to turn on a vertical pivot in the second fork, substantially as described.

6. In a wheel-mount, the combination with a fork; of a support having lateral extensions, rods fixed to the extensions and passing through the tines of the fork, coil-springs surrounding the rods and between the extensions and upper tine of the fork, a second fork on the support, a revoluble pivot-pin passing through the tines of the fork and a wheel-spindle fixed on and movable with said pin between the tines of the second fork.

7. In a wheel-mount, the combination with a fork; of a support, means to yieldingly mount the support in the fork, a dash-pot, a piston therein and mechanism to operatively connect the piston and support.

8. In a wheel-mount, the combination with a fork; of a support, a dash-pot and piston, means to operatively connect the piston and support and a coil-spring to assist the cushioning action of the piston.

9. In a wheel-mount, the combination with a fork; of a support yieldingly mounted therein, a dash-pot, a piston and a spring therein and means to operatively connect the piston and support.

10. In a wheel-mount, the combination with a fork; of a support yieldingly mounted therein, a dash-pot, a piston and a spring therein, a piston-rod jointed to the piston, a bell-crank lever mounted on the fork and connected at one end to the piston-rod, a link connecting the other end of the bell-crank to the support and a spring connected at one end to the vehicle-frame and at the other to the piston-rod.

11. In a wheel-mount, the combination with an axle having a fork on its ends; of a support in the fork, means to yieldingly hold the support in the fork, a dash-pot having an air-port, a piston and a spring therein, said port controlled by the piston, a piston-rod, a bell-crank lever operatively connected at one end to the rod, a link connecting the other end of the bell-crank lever to the support, a second fork on the support, a pivot-pin loosely mounted in said second fork, a wheel-spindle fixed on the pin within the fork and a coil-spring to antagonize the movement of the piston-rod and bell-crank lever from their normal positions.

12. The combination with a vehicle-wheel, an independent yielding mount for the wheel whereby said wheel will have relative vertical movement independent of the other wheels on the vehicle, a dash-pot out of the line of movement of said mount, a piston in the dash-pot and devices operatively connecting the piston and mount, substantially as described.

In testimony that I claim the foregoing as my invention I have signed my name in presence of two subscribing witnesses.

GEORGE D. MUNSING.

Witnesses:
THOMAS HOGAN,
A. ELLIOTT RAMSEY.